Dec. 31, 1929.  A. G. McCALEB  1,741,161
LOCKING DEVICE
Filed March 5, 1925    4 Sheets-Sheet 1
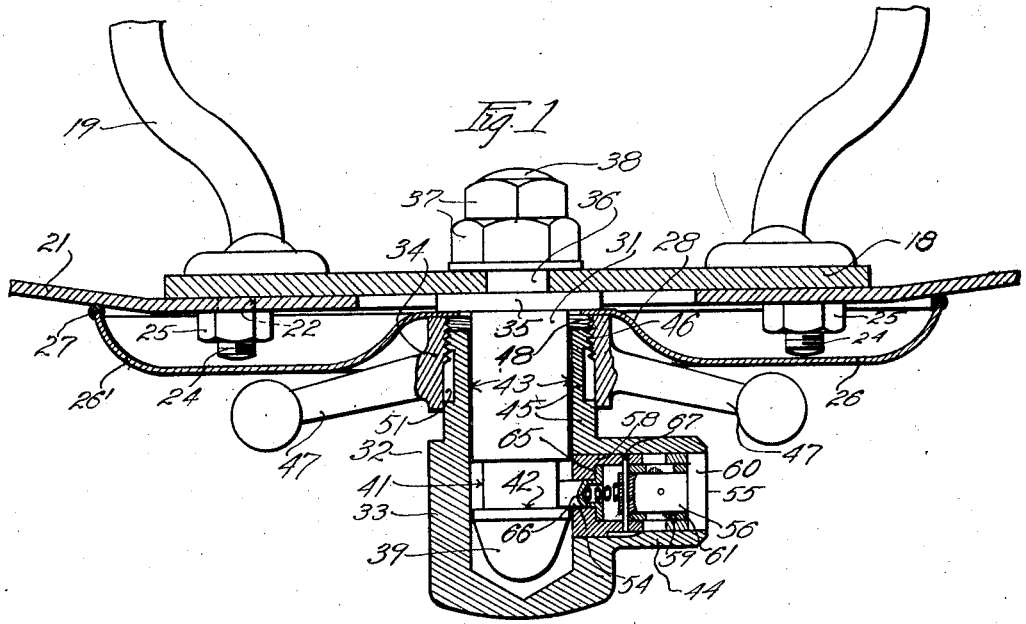
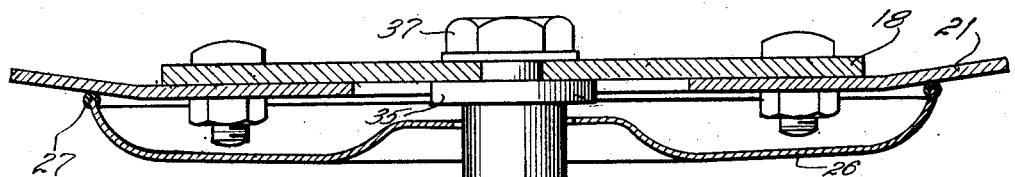
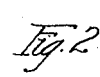
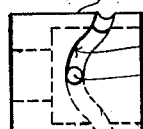
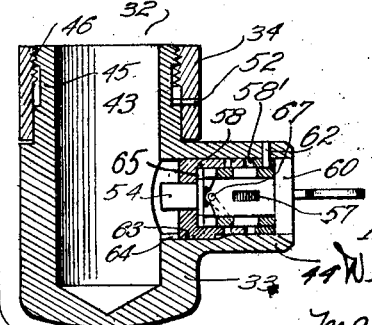

Dec. 31, 1929.  A. G. McCALEB  1,741,161
LOCKING DEVICE
Filed March 5, 1925  4 Sheets-Sheet 2
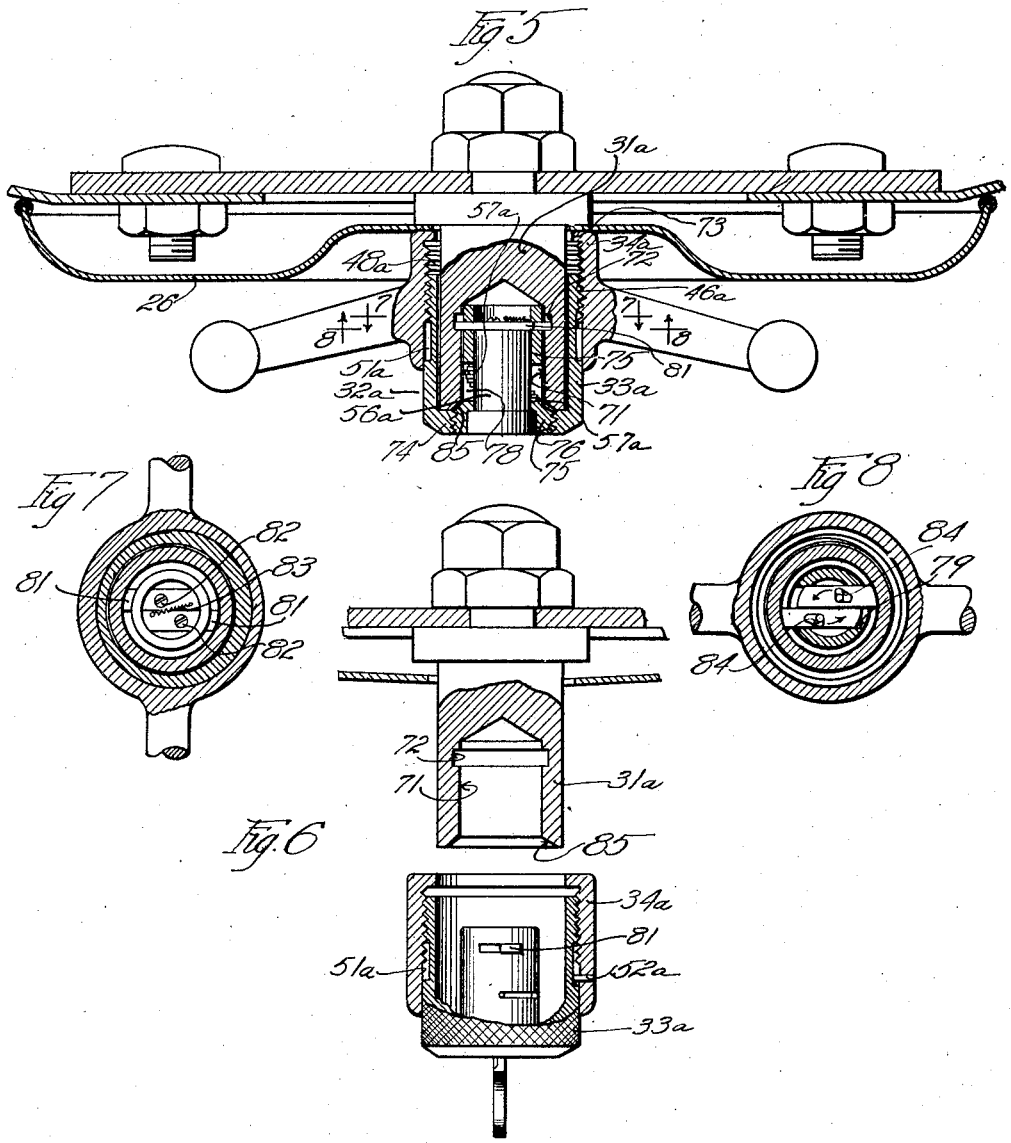

Dec. 31, 1929.  A. G. McCALEB  1,741,161
LOCKING DEVICE
Filed March 5, 1925  4 Sheets-Sheet 3
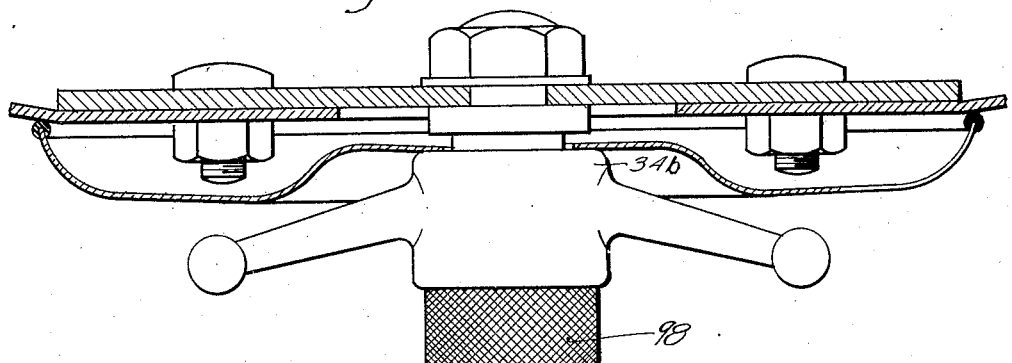
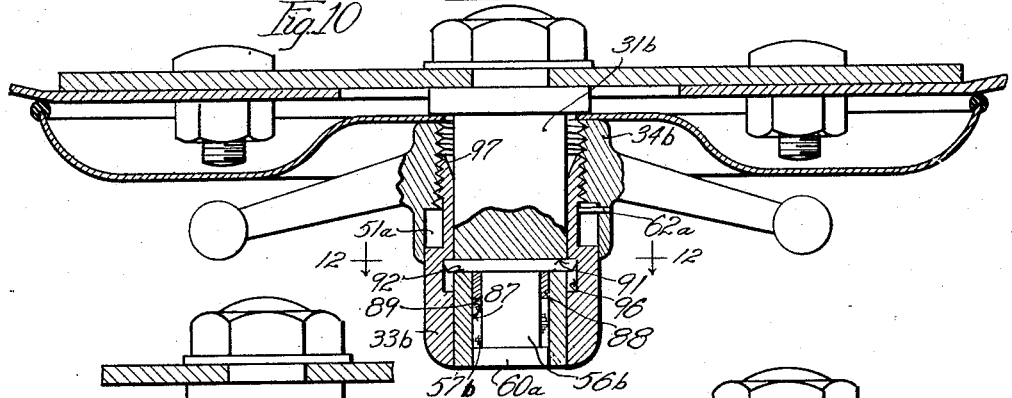
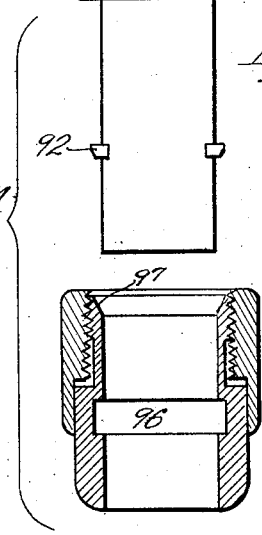
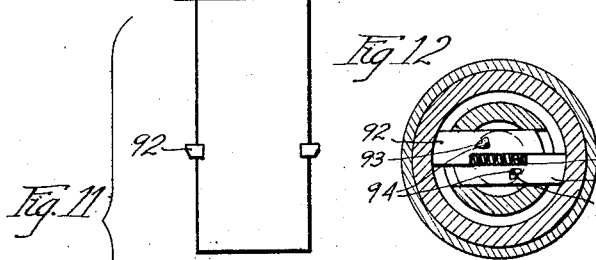
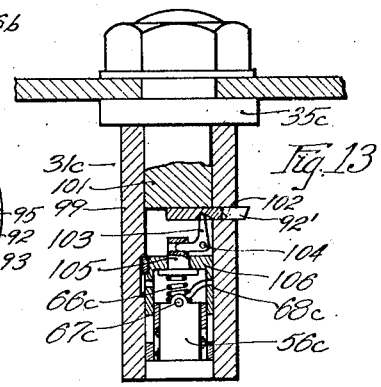
Inventor
A G McCaleb
Williams, Bradbury,
McCaleb & Hinkle
Attys.

Dec. 31, 1929.  A. G. McCALEB  1,741,161
LOCKING DEVICE
Filed March 5, 1925  4 Sheets-Sheet 4
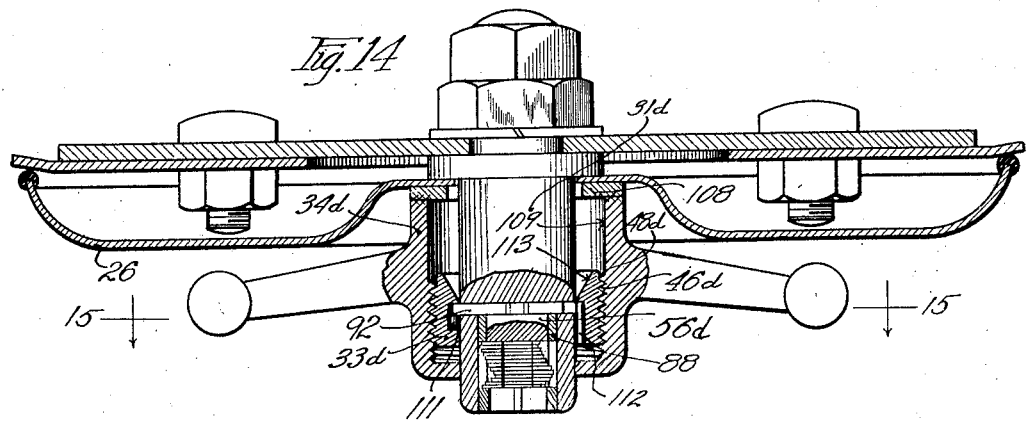
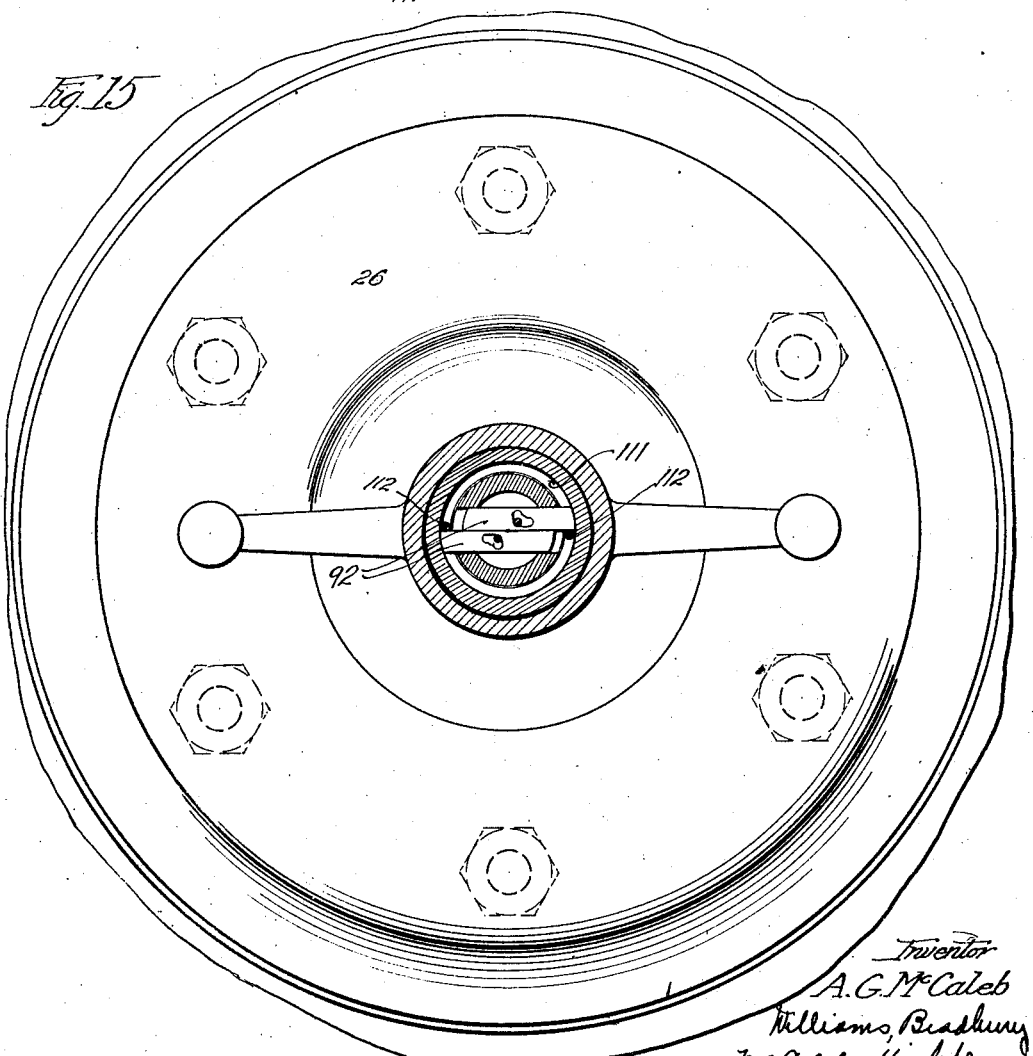

Patented Dec. 31, 1929

1,741,161

UNITED STATES PATENT OFFICE

ALBERT G. McCALEB, OF CHICAGO, ILLINOIS, ASSIGNOR TO PINES WINTERFRONT COMPANY, OF CHICAGO, ILLINOIS, A CORPORATION OF DELAWARE

LOCKING DEVICE

Application filed March 5, 1925. Serial No. 13,047.

The present invention relates to locking devices, and has particular reference to spare wheel locks for automobiles, although, as will be hereinafter apparent from the following description of my invention, the fundamental features thereof are applicable to locks for various uses.

The present locking device embodies a stationary mounting stud and a locking unit which fits over this mounting stud for making locking attachment thereto. The wheel or other object to be locked is first placed over this mounting stud, and the locking unit is thereafter placed over the mounting stud and locked thereto. When using the present locking device for locking disk wheels to a spare wheel carrier on the car, a cover plate is usually interposed between the disk wheel and the locking unit to cover certain attaching bolts which secure the disk wheel to the carrier.

The locking unit which fits over the mounting stud comprises a retaining member and a cooperating pressure member which has screw-threaded engagement with the retaining member, or some equivalent operative connection which will enable the pressure member to be forced against the wheel under clamping pressure. The retaining member is locked to the mounting stud in such manner that it is held against longitudinal movement so that it cannot be backed off the end of the stud, and in this locked position acts as an abutment from which the pressure member is screwed forwardly or otherwise moved into pressure engagement with the wheel.

One of the principal objects of the invention is to provide a locking device of the general type described above in which it will be impossible to exert breaking pressure on the retaining member or on the mounting stud through an attempted forced rotation of the pressure member. This is attained by either making the pressure member freely rotatable on the retaining member, or the retaining member freely rotatable on the mounting stud, so that forced rotation applied to the pressure member will be ineffective for breaking the lock.

Another object of the invention is to reduce the number of parts and otherwise simplify a lock of the above general description.

Other objects will be apparent from the following detailed description of my invention. Referring to the drawings illustrating this description:

Figure 1 is a horizontal sectional view of one form of my improved locking device associated with the spare wheel carrier of an automobile;

Figure 2 is a similar view showing the locking unit removed from the mounting stud;

Figure 3 is a detail elevational view of one of the parts of the locking bolt mechanism;

Figure 4 is a fragmentary view illustrating a slightly modified form of mounting stud and locking bolt;

Figure 5 is a view similar to Fig. 1, showing another embodiment of my invention, wherein the lock barrel and the associated locking bolts are received in an opening in the mounting stud;

Figure 6 is a similar view showing the locking unit removed from the mounting stud;

Figure 7 is a transverse sectional view taken on the plane of the line 7—7 of Fig. 5;

Fig. 8 is a sectional view taken on the plane of the line 8—8 of Fig. 5 showing the lost motion slots in the locking bolts;

Figures 9 and 10 are elevational and sectional views, respectively, of another type of locking device in which the lock barrel and locking bolts are permanently mounted in the mounting stud;

Figure 11 is a detail view showing the locking unit removed from the mounting stud;

Figure 12 is a transverse sectional view taken on the plane of the line 12—12 of Fig. 10;

Figure 13 is a fragmentary sectional view through the mounting stud, showing a modified arrangement of lock mechanism for retracting the locking bolts;

Figure 14 is a horizontal sectional view through still another modified form of my invention, and Figure 15 is a transverse sectional view taken approximately in the plane of the line 15—15 of Fig. 14.

Fig. 1 illustrates an exemplary form of spare wheel mounting bracket which is intended as being representative of the different types of spare wheel mounts to which my improved device is applicable. This mounting bracket comprises a circular plate 18 supported by a plurality of supporting arms 19 extending from the body of the car. This bracket may be supported at the rear end of the car, or along the side of the car above the running board, both locations being prevalent for spare wheel mounting.

A disk type of spare wheel is illustrated fragmentarily by the portion of disk 21, the hub portion in this disk being generally provided with a plurality of apertures 22 for receiving hub bolts carried on the hub of the wheel. For rigidity of mounting, the plate 18 is provided with a plurality of stud bolts 24 which are adapted to be received in these openings 22 when the wheel is mounted on the bracket plate 18. Nuts 25 screw over the stud bolts and rigidly clamp the disk of the wheel to the bracket plate. The stud bolts 24 are riveted or otherwise suitably anchored to the bracket plate.

For covering these stud bolts 24, a cover plate 26 is generally placed over the outer side of the wheel before the locking unit is placed in locking position. This cover plate prevents access to the stud bolts 24 and thereby prevents removal of the wheel. The inwardly curved flange 26' of the cover plate may have its edge faced with a slotted strip of rubber 27, or other resilient or pliable facing bead, to prevent marring the surface of the disk wheel 21.

Extending centrally from the bracket plate 18 is a mounting stud 31 over which fits the locking unit 32. The locking unit comprises the retaining member 33 and the pressure or screw-threaded member 34 which has screw-threaded mounting on the retaining member 33. The mounting stud 31 is provided with a flange or collar 35 which bears against the front of the bracket plate 18, and projecting beyond this collar 35 is a reduced threaded portion 36 which passes through a hole in the mounting plate and receives nuts 37. To prevent any possibility of releasing the stud from the rear side of the mounting bracket, the end of the stud can be riveted over the end of the outer lock nut 37, as indicated at 38. The outer end of the mounting stud 31 is tapered to provide a cone-shaped portion 39 which functions to press the spring-urged locking bolt of the lock mechanism back into the lock barrel when the device is slipped over the mounting stud. In back of this tapered head portion 39 is formed a relatively wide groove 41 into which the locking bolt is snapped when the retaining member 33 is properly positioned on the mounting stud. This groove forms an annular locking shoulder 42 which is adapted to cooperate with the locking bolt in preventing removal of the retaining member 33 from the mounting stud.

The retaining member 33 comprises a substantially cylindrical casting having a main bore 43 for receiving the mounting stud, and having a lateral protuberance or boss 44 for receiving the lock mechanism. The outer end of the casting is of relatively thick section so as to adequately protect the lock barrel and locking bolt. The inner end of the casting 33 may be reduced, as indicated at 45, and the end of this reduced portion is provided with a relatively heavy external thread 46. The pressure member or clamping member 34 comprises a cylindrical hub from which extend two or more arms 47 to enable the necessary clamping pressure to be exerted on the member 34 so as to rigidly lock the cover plate 26 against the collar 35. The member 34 has an axial bore which is threaded at 48 for screwing over the thread 46 on the end of the retaining member. It is desirable that the retaining member 33 and the clamping member 34 be held together against complete separation so that these two parts cannot become completely disassembled. To this end I have provided an annular groove 51 in the reduced portion of the retaining member just in front of the thread 46, into which annular groove projects a pin 52 (Fig. 2), which is driven in through the side of the clamping member 34. It will be obvious that in lieu of this pin 52 other expedients may be resorted to, such as turning the outer end of the clamping member 34 into this annular groove 51 to provide a shoulder which will prevent the clamping member from being screwed completely off the retaining member.

The locking bolt 54 is of any suitable type which is urged inwardly to locking position under spring pressure. Any suitable construction of pin tumbler lock or other form of lock may be employed for retracting this locking bolt 54. The present lock mechanism 55 comprises a lock barrel 56, which carries the pin tumblers 57, and an axially reciprocable sleeve 58 which is retracted by the rotation of this lock barrel to draw the bolt 54 back into unlocked position. The front end of the lock barrel 56 has an enlarged head 60 which completely fills the end of the bore 58 in the cylindrical boss 44. The pin tumblers project into slots 59 in a sleeve 61 which is pinned in the bore 58, as indicated at 62 in Fig. 2. The reciprocable sleeve 58 has a spline or key 63 which engages in a slot 64 in the wall of the bore 58, permitting this sleeve 58 to reciprocate but preventing it from turning. The outer end of the sleeve 58 has a relatively large bore which telescopes over the inner reduced end of the sleeve 61, and the locking bolt has a flange or collar 65 which engages the bottom of this enlarged bore. A compression spring 66 confined between the end of the lock barrel 56 and a counterbore in the locking bolt 54 normally urges the locking bolt inwardly into locked position behind the locking shoulder 42. The sleeve 58 is retracted for retracting the locking bolt 54 through a pin 67 which extends diametrically through the end of the lock barrel 56 and engages in two cam slots 68 cut in the walls of the reciprocable sleeve 58 (see Fig. 3). From this it will be seen that when the lock barrel 56 is free to be rotated, after the insertion of the proper key, the rotation of the cross pin 67 will operate to retract the sleeve 58 and thereby withdraw the locking bolt 54 from locking engagement behind the shoulder 42.

The operation of this embodiment of my invention is as follows: After the disk wheel 21 has been placed on the bracket plate 18 and has been secured thereto by drawing up th nuts 25 on the stud bolts 24, the cover plate 26 is slipped over the mounting stud 31 to cover the stud bolts. The locking unit 32 is then slipped over the mounting stud 31, the bolt 54 being cammed back into the lock mechanism by the tapered end 39 of the stud, and then snapping back into locked position behind the shoulder 42. Thereupon the retaining member 33 is held with one hand, and the clamping member 34 is rotated with the other hand, so as to screw the same forwardly into firm clamping engagement with the cover plate 26, forcing the central part of this cover plate into engagement with the collar 35. It will be noted that in this act of screwing the clamping member 34 up against the cover plate 26, the retaining member 33 acts as an abutment against which this clamping pressure re-acts. In removing the locking device the clamping member 34 is backed away from the cover plate 26 by rotating the same relative to the retaining member 33, and after the clamping pressure has been released sufficiently to remove the lateral pressure from the locking bolt 54, the rotation of the lock barrel 56, through the turning of the key, will operate to retract the locking bolt and permit the removal of the entire unit from the mounting stud. It will be noted that in the operation of applying and releasing the locking unit, the lateral protuberance 44, in which is housed the lock mechanism, will afford projecting means which can be firmly grasped in the holding of the retaining member 33.

Any tendency to loosen the lock under vibration of the car is avoided by the lock nut action of the cover plate 26. The plate is stamped so that the cupped portion 28, and the plate, as a whole, will have a certain resilience tending to spring it away from the shoulder 35 of the mounting stud. This resilience acts as a lock washer for preventing rattle or loosening of the locking unit.

In the embodiment shown in Fig. 4, the mounting stud 31 has a plurality of annular locking grooves 41' forming a plurality of spaced locking shoulders 42'. The rear walls of these grooves may be bevelled to facilitate camming the locking bolt 54' back into the locking mechanism, and the rear edge of the locking bolt may also have a cooperating cam slope to facilitate this action. This provision of a plurality of locking grooves 41' provides a gross adjustment for the device, the screw thread mounting of the clamping member 34 providing the fine adjustment. In mounting this embodiment of locking device, the unit is slipped over the stud and pushed back along the stud as far as it will go. The locking bolt 54' will snap into one of the grooves 41', and from this point only a comparatively small adjustment need be made by the clamping member 34 in bringing it into firm clamping engagement with the cover plate 26.

In Figs. 5 to 8, inclusive, I have shown an embodiment wherein the lock mechanism is carried by the unit 32ª, but this lock mechanism is disposed axially of the locking unit and is received in an axial opening in the mounting stud. The stud 31ª need not be as long as the stud in the preceding embodiment, but is made of larger diameter and is provided with an axial bore 71 entering from the outer end of the stud. An internal annular groove 72 is formed in this bore adjacent the inner end thereof, for receiving the locking bolts which I shall presently describe. This groove may be cut directly in the bore 71, or may be formed by driving a short sleeve into an enlarged bore so as to leave the groove 72 between the end of the sleeve and the bottom of this enlarged bore.

The retaining member 33ª is provided with the external thread 46ª on which screws the thread 48ª of the clamping member 34ª, in substantially the manner before described. A pin 52ª may also be provided in the clamping member 34ª for playing in the annular groove 51ª of the retaining member and thereby preventing complete separation of the retaining member and clamping member. The front end of the clamping member 34ª may be provided with an inwardly turned flange 73 for providing a more extensive area for contact with the cover plate 26, and for preventing the clamping member being screwed back along the retaining member to a point where the pin 52ª might be broken.

The outer end of the retaining member 33ª has an inwardly turned flange 74 in which is mounted a sleeve 75 which supports the lock mechanism. This sleeve is supported in the flanged end 74 of the retaining member in any suitable manner so that it will be rigidly held therein against unauthorized removal of the lock mechanism. For example, the outer end of the sleeve 75 may be provided with an enlarged threaded end 76 screwing into threads in the flanged end 74 and being pinned therein to prevent unauthorized separation of the parts.

The lock barrel 56$^a$ is supported in the sleeve 75, the latter having slots 78 for receiving the tumblers or other locking elements 57$^a$ of the lock barrel. The lock barrel 56$^a$ terminates substantially flush with the locking groove 72, but the housing sleeve 75 extends beyond this groove, as clearly shown in Fig. 5. Cut in diametrically opposite sides of the housing sleeve 75 substantially flush with the end of the lock barrel are slots 79 for receiving the two locking bolts 81—81. As shown in Fig. 7, these locking bolts extend across the end of the lock barrel 56$^a$ and have suitable operative connection therewith whereby they are reciprocated by the rotation of the lock barrel. Such operative connection may consist of small pins or screws 82 extending through the locking bolts and engaging in the end of the lock barrel. A suitable tension spring 83 may be employed for thrusting the bolts outwardly into engagement with the groove 72, said spring having its opposite ends connected to the inner ends of the locking bolts. For permitting this outward movement of the locking bolts under the tension of the spring, the screws or pins 82 are arranged to play in lost motion slots 84 in the locking bolts, shown in Fig. 8. The outer end of the bore 71 in the stud 31$^a$ is bevelled, as indicated at 85, so that in the mounting of the locking device on the stud, the bolts 81 will be cammed back within the confines of the housing sleeve 75 by this bevelled surface 85. The lost motion slots 84 will permit this inward movement of the locking bolts 81 without necessitating rotation of the lock barrel 56$^a$, but when the lock barrel is rotated through the instrumentality of the key, in the direction of the arrow in Fig. 8, these pins will act against the enlarged ends of the slots 84 and will retract these locking bolts so that their outer ends will clear the groove 72. The operation of this embodiment is generally similar to the preceding embodiment in Fig. 1. The device is slipped over the mounting stud 31$^a$, the lock mechanism taking into the bore 71 and having its locking bolts thrust inwardly until they come into register with the locking groove 72, whereupon they are snapped outwardly into this groove for locking the retaining member 33$^a$ to the mounting stud. Thereupon the clamping member 34$^a$ is screwed forwardly into clamping engagement with the cover plate 26. The release of the locking unit is effected by first taking the endwise pressure off of the locking bolts by backing the clamping member 34$^a$ away from the cover plate, whereupon the rotation of the lock barrel 56$^a$ will withdraw the locking bolts and permit the removal of the entire unit. It will be observed that a considerable portion of the retaining member 33$^a$ projects beyond the end of the clamping member 34$^a$, this projecting portion serving as a gripping surface by which the retaining member is held with one hand while the clamping member is screwed forwardly with the other.

In Figs. 9, 10 and 11 I have shown another form of my invention differing from the preceding embodiment in that the locking mechanism is a permanently associated part of the mounting stud. This construction possesses the advantage that the locking mechanism is not susceptible to fouling or injury, such as might result from the careless handling of the locking unit or the dropping of the unit in dirt or mud. The outer end of the mounting stud 31$^b$ is provided with an axial bore 87 in which is inserted a housing sleeve 88 for the lock barrel 56$^b$. This sleeve 88 has diametrically opposite slots 89 for receiving the pin tumblers or other locking elements 57$^b$. Cut transversely through the mounting stud 31$^b$ substantially flush with the lock barrel 56$^b$ is a slotted area 91 in which reciprocate two locking bolts 92, similar to the bolts 81 of the preceding embodiment. These locking bolts have slots 93 which receive pins 94 on the end of the lock barrel 56$^b$, these slots and pins having substantially the same lost motion relation illustrated in Fig. 8. A compression spring 95 has confined between notched shoulders the two locking bolts for normally urging the locking bolts outwardly through the slots 91 into engagement with the locking groove 96 in the retaining member. The two locking bolts 92 and the spring 95 can be assembled through the lateral slots 91 in the mounting stud, and the lock barrel thereafter inserted and its pins 94 inserted in the slots 93 of the locking bolts. The lock barrel is, of course, rigidly held in the bore 87, as by pinning the head 60$^a$ in the end of the stud.

The retaining member 33$^b$ has its forward end threaded for receiving the internally threaded clamping member 34$^b$, as described of the preceding figures, and the clamping member 34$^b$ has the pin 62$^a$ or some equivalent projection engaging in the groove 51$^a$ of the retaining member to prevent complete separation of the two parts. The front end of the bore in the retaining member is chamfered back as indicated at 97, and the outer edges of the locking bolts 92 may also be bevelled so that, in the placing of the locking unit over the mounting stud, the locking bolts will be cammed back into the stud for snapping out into the locking groove 96 of the retaining member. The projecting outer surface of the retaining member may be knurled, as indicated at 98, for grasping this retaining member while the clamping member is being screwed or unscrewed on the same in locking or releasing the device. Fig. 13 illustrates a modified design of lock mechanism employing an axially operating spring-pressed plunger for projecting the locking bolt 92′.

In this form, the mounting stud 31ᶜ is constructed of a sleeve 99 which is rigidly secured over the reduced end 101 projecting from the collar 35ᶜ. The locking bolt 92′ reciprocates in a transverse slot 102 cut in the wall of the sleeve 99, the inner end of this locking bolt being guided by contact across the end of the reduced end 101. A small bell crank lever 103 is pivoted within the bore of the sleeve 99 on a transverse pin 104, one arm of this bell crank lever engaging in a notch 92′ and the other arm having operative connection with a spring-pressed plunger 105 which is carried in the reciprocating sleeve 106. The sleeve 106 is substantially similar to the reciprocating sleeve 58 of Figs. 1 and 2, having a suitable spline or key engaging in a slot in the sleeve 99 for preventing rotation of the sleeve, but permitting its endwise reciprocation. A spring 66ᶜ normally thrusts the plunger 105 forwardly in the bore of the sleeve 106 to project the locking bolt 92′ from the periphery of the mounting stud. The sleeve 106 is drawn backwardly or outwardly to retract the locking bolt 92′ by a transverse pin 67ᶜ engaging in cam slots 68ᶜ of the sleeve in substantially the manner described of the sleeve 58 of Fig. 1. The operation of this modification will be obvious from the description of Figs. 9 and 10. It will be observed that in each of the forms shown in Figs. 13, 10 and 5, the same locking relation is established between the mounting stud and the retaining member as was described of Fig. 1, that is to say, the retaining member is locked against longitudinal removal from the mounting stud but is free to rotate thereon so that rotative effort applied to the clamping member is inoperative to break the locking device.

In Figs. 14 and 15 I have illustrated still another form in which the lock mechanism is permanently embodied in the mounting stud 31ᵈ. The lock barrel 56ᵈ is supported in a housing sleeve 88 for operating the locking bolts 92 in susbstantially the same manner as described of Figs. 9 and 10. In this form, the retaining member 33ᵈ is completely housed within a clamping member 34ᵈ, there being no projecting portion of the retaining member 33ᵈ which can be grasped in screwing the clamping member into and out of engagement with the cover plate 26. The retaining member 33ᵈ is made of comparatively short length with its thread 46ᵈ extending substantially its entire length. The cooperating thread 48ᵈ in the bore of the clamping member 34ᵈ is confined to the outer end of this bore. The front end of the bore is left smooth over a length exceeding that of the threaded length 46ᵈ of the retaining member. The front end of the retaining member has an inwardly turned flange 108 which is adapted to strike the end of the retaining member 33ᵈ and prevent removal of the clamping member except when the retaining member has been unlocked and is free to come off the stud with the clamping member. The object of leaving the front end of the bore in the clamping member smooth or unthreaded, as indicated at 109, is to effect complete disengagement between the threads of the clamping member and the threads of the retaining member by the time the shoulder 108 is in position to engage the end of the retaining member 33ᵈ. This leaves the clamping member 34ᵈ free to spin on the retaining member and prevents any possibility of forced rotation of the retaining member through the rotation of the clamping member 34ᵈ. This is necessary or desirable in this particular embodiment, because the retaining member 33ᵈ is held against rotation on the stud 31ᵈ when in locked position thereon.

The locking bolts 92 project into an internal groove 111 in the bore of the retaining member 33ᵈ, and at one or more points in this groove there are provided pins or shoulders 112 which engage the sides of the locking bolts 92 and prevent rotation of the retaining member on the mounting stud. This holding of the retaining member against rotation when in locked position on the stud is necessary for the reason that there is no projecting portion of the retaining member which can be held in screwing the clamping member forwardly or backwardly in locking or unlocking the device. Because of the unthreaded end 109 of the bore in the clamping member 34ᵈ, however, there is no possibility of rotative effort applied to the clamping member being utilized to break the retaining member 33ᵈ or its locked connection to the mounting stud. The front end of the retaining member is chamfered at 113 to provide a cam slope for pressing the locking bolts 92 inwardly within the mounting stud when the device is slipped over the stud. After the locking bolts have snapped into the groove 111. the clamping member 34ᵈ can be screwed forwardly into clamping engagement with the cover plate on the non-rotative abutment afforded by the retaining member 33ᵈ.

I do not intend to be limited to the particular details herein shown and described, except as they are defined in the appended claims.

What I claim is new and desire to secure by Letters Patent of the United States, is:

1. In a locking device of the class described, the combination of a stationary mounting member, a retaining member adapted for mounting on said mounting member, clamping means mounted on said retaining member and adapted to be advanced and retracted along said retaining member by relative rotative movement therebetween, and lock mechanism carried by one of said members adapted to engage a locking shoulder on the other of said members.

2. In a locking device of the class described, the combination of a stud member, a retaining member receivable over said stud member, a clamping member mounted on said retaining member, releasable means for connecting said retaining member to said stud member to prevent endwise removal of said retaining member from said stud member, and means for connecting said clamping member to said retaining member whereby said clamping member will have longitudinal movement thereon, one of said means permitting free relative rotation between said clamping member and said stud member, when said clamping member is moved back to the outer limit of its longitudinal movement.

3. In a locking device of the class described, the combination of a stud member, a retaining member receivable over said stud member, a clamping member mounted on said retaining member, releasable lock means for connecting said retaining member to said stud member to prevent endwise removal of said retaining member from said stud member, and thread means connecting said clamping member to said retaining member whereby said clamping member has longitudinal threading movement on said retaining member, one of the aforesaid means permitting free relative rotation between said clamping member and said stud member, when said clamping member is moved back to the outer limit of its longitudinal movement.

4. In a locking device of the class described, the combination of a stud member, a retaining member for mounting on said stud member, a clamping element mounted on said retaining member, lock means comprising a locking shoulder on one of said members, locking mechanism carried by the other of said members for engaging said shoulder to prevent longitudinal separation of said members, and thread means connecting said clamping element to said retaining member whereby said clamping element will have longitudinal threading motion thereon, one of the aforesaid means permitting free relative rotation between said clamping element and said stud member when said clamping element is moved back to the outer limit of its longitudinal movement.

5. In a locking device of the class described, the combination of a mounting stud, a retaining member for mounting on said stud, locking means for preventing endwise removal of said retaining member from said stud, a thread on said retaining member, a clamping member screwing on said thread and having longitudinal movement along said retaining member, and a freely rotative joint between said clamping member and said stud permitting free rotation of said clamping member relative to said stud when said clamping member reaches the outer limit of its longitudinal movement.

6. In a locking device of the class described, the combination of a mounting stud, a locking unit receivable over said mounting stud, said locking unit comprising a retaining member, a thread on said retaining member, and a clamping member having threaded mounting on said thread, means for locking said retaining member to said stud, and a freely rotating joint between said clamping member and said stud preventing said clamping member from transmitting positive rotative effort to said stud when screwed back to the outer end of said stud.

7. In a locking device of the class described, the combination of a mounting stud, a locking unit receivable over said mounting stud, said locking unit comprising a retaining member and a clamping member having threaded mounting on said retaining member, and means for locking said retaining member to said stud, said clamping member being free to rotate relative to said stud when at the outer limit of its threaded movement.

8. In lock mechanism, the combination of a stud member, a retaining member, clamping means having adjustable mounting on said retaining member, an annular locking shoulder on one of said members, and lock mechanism carried by the other of said members for engaging said annular locking shoulder.

9. In lock mechanism, the combination of a stud member, a retaining member adapted for rotative mounting on said stud member, clamping means adjustably mounted on said retaining member, and lock mechanism for locking said retaining member to said stud member.

10. In locking mechanism, the combination of a mounting stud, a retaining member adapted for mounting on said stud, a clamping member having longitudinal movement on said retaining member, and a lock mechanism for locking said retaining member to said stud but permitting relative rotation therebetween.

11. In lock mechanism, the combination of a mounting stud, a retaining member adapted for mounting on said stud, a clamping member adjustably supported on said retaining member, a locking shoulder on said stud, and lock mechanism carried by said retaining member for engagement with said locking shoulder, said retaining member having rotative movement on said stud when locked thereto.

12. In lock mechanism, the combination of a mounting stud, a retaining member receivable on said stud, a clamping member adjustably supported on said retaining member, an annular locking shoulder on said stud, and lock mechanism carried by said retaining member for engagement with said annular locking shoulder.

13. In lock mechanism, the combination of a mounting stud, a retaining member adapted for mounting on said stud, a thread on the front end of said retaining member, a clamping member screwing on said thread, a locking shoulder on said stud, a lock mechanism carried by said retaining member for engagement with said locking shoulder, said locking shoulder and said lock mechanism permitting rotative movement of said retaining member on said stud when locked thereto.

14. In lock mechanism, the combination of a mounting stud, a retaining member adapted for mounting thereon, a thread on said retaining member, a clamping member screwing on said thread, a locking shoulder on said stud, a depressible locking bolt carried by said retaining member for engagement with said locking shoulder, and a cam slope on said stud for depressing said locking bolt when said retaining member is placed over said stud.

15. In lock mechanism, the combination of a stud member, a retaining member adapted for mounting thereon, a thread on said retaining member, a clamping element screwing on said thread, an annular locking shoulder on said stud, a spring-pressed locking bolt carried by said retaining member for engagement with said annular locking shoulder, and a cam slope on said stud for pressing said locking bolt into position for engaging with said locking shoulder when said retaining member is moved onto said stud.

16. In locking mechanism, the combination of a mounting stud, a retaining member adapted for mounting on said stud, a clamping member having adjustable mounting on said retaining member, a locking shoulder on said stud, and lock mechanism carried by said retaining member comprising a radially retractable locking bolt for engagement with said locking shoulder.

17. In lock mechanism, the combination of a stud member, a retaining member adapted for mounting on said stud member, a clamping element having adjustable mounting on said retaining member, and lock mechanism for locking said retaining member and said stud member, said lock mechanism comprising a radially retractable spring-pressed locking bolt carried by one of said members adapted to engage the locking shoulder associated with the other of said members.

18. In lock mechanism, the combination of a stud member, a retaining member having a longitudinal bore therein for engaging over said stud member, a clamping element adjustably mounted on said retaining member, a locking shoulder on one of said members, and a reciprocable locking bolt carried by the other of said members adapted to move transversely of said bore for engagement with said locking shoulder.

19. In a locking device of the class described, the combination of a mounting stud having a substantially axial opening in the end thereof, a retaining element having a longitudinal bore therein engaging over said stud, and threaded on said retaining member, a clamping element screwing on said thread, and lock mechanism carried in the bore of said retaining member and receivable in the opening of said stud member, said lock mechanism comprising a laterally moving locking bolt adapted to engage a locking shoulder in said opening.

20. In a locking device of the class described, the combination of a mounting stud having a substantially axial opening in the end thereof, a retaining member having an axial bore therein for engaging over said mounting stud, a thread in the front end of said retaining member, a clamping collar screwing over said thread, handle means projecting from said clamping collar, a housing sleeve carried by said retaining member and receivable in said axial opening, a lock barrel in said sleeve, a pair of laterally operating locking bolts adapted to be projected through openings in said sleeve for engaging in a locking groove in said axial opening, said locking bolts having lost motion slots therein, pins projecting from said lock barred into said slots, and spring means normally tending to project said locking bolts into said locking groove.

In witness whereof, I hereunto subscribe my name this 27 day of February, 1925.

ALBERT G. McCALEB.